Patented July 2, 1946

2,403,038

UNITED STATES PATENT OFFICE 2,403,038

SURFACE-ACTIVE AGENTS

David Aelony, Dayton, Ohio, assignor to Monsanto Chemical Company, St. Louis, Mo., a corporation of Delaware No Drawing. Application December 14, 1944,
Serial No. 568,199

16 Claims. (Cl. 260—468)

1

The present invention relates to surface-active agents and is particularly concerned with sulfonated alkyl esters of alloöcimene-maleic anhydride adduct as compounds possessing a high degree of utility in the field of wetting-out agents.

Alloöcimene undergoes the Diels-Alder reaction with maleic anhydride to give a tetrahydrophthalic anhydride derivative having one of the two following structures (Norton, Chem. Rev. 31, 385–6 (1942)):

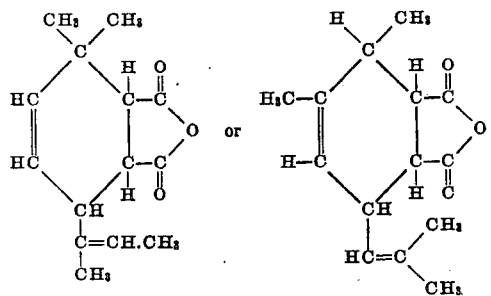

Although this addition compound, or adduct, has been studied by a number of investigators (Arbuzov, Ber. 67, 572, 1946; Dupont and others, Bull. soc. chim. (5) 5, 322; Hultzsch, Ber. 72, 1173; Goldblatt and Palkin JACS 63, 3520; Lozach, Bull. soc. chim. (5) 8, 519), its structural formula has not been positively established. Hence, in the following description of the present invention, the reaction product of alloöcimene and maleic anhydride having one of the two structures, shown above, will be referred to as alloöcimene-maleic anhydride adduct. It is a white, crystalline product having a melting point of 81° C.–82° C. or 83° C.–84° C., depending upon the purity of the product. Alloöcimene (2,6-dimethyl-2,4,6-octatriene) is a readily obtainable raw material, being produced easily by vapor phase thermal isomerization of alpha-pinene.

Alloöcimene-maleic anhydride adduct has been reacted with methanol in the presence of sulfuric acid to give the dimethyl ester of the adduct (Hultzsch, Ber. 72, 1186). As far as I have been able to ascertain, the higher esters of the adduct have not been prepared.

I have prepared the higher dialkyl esters of alloöcimene-maleic anhydride adduct and have found that when certain of these esters are converted to sulfonates there are obtained materials which are characterized by a high degree of surface-activity. Sulfonic acid groups can be readily introduced, for example, by reaction with

2 sulfuric acid, oleum, chlorosulfonic acid, etc., into one or both of the olefinic double bonds of the diesterified alloöcimene-maleic anhydride adduct. Upon neutralization of the resulting sulfonic acids, for example, by treatment with a base such as an organic or inorganic base, there are obtained salts of sulfonated esters of the alloöcimene-maleic anhydride adduct. While all of the diesters of alloöcimene-maleic anhydride adduct and aliphatic, monohydric alcohols of from 1 to 12 carbon atoms may thus be readily converted to the sulfonates of the corresponding tetrahydrophthalates, I have found that optimum wetting-out properties are evidenced by only a narrow range of such products, i. e., only by salts of sulfonated diesters of alloöcimene-maleic anhydride adduct and aliphatic, monohydric alcohols having more than 4 but less than 11 carbon atoms. The sodium salts of sulfonated dimethyl, diethyl, dipropyl or dibutyl esters of alloöcimene-maleic anhydride adduct are of little, if any, value as capillary-active or wetting-out agents. The sodium salt of sulfonated dilauryl ester of alloöcimene-maleic anhydride adduct is of less value than the sodium salt of the dibutyl ester of the adduct. The diamyl, bis(2-ethylbutyl), dihexyl, diheptyl, bis(2-ethylhexyl) and didecyl esters of alloöcimene-maleic anhydride yield, upon sulfonation and subsequent neutralization, products which have been found to possess pronounced wetting-out properties, the bis(2-ethylhexyl) ester yielding the most effective product.

The alkali metal, ammonium and organic base salts of the sulfonated dialkyl esters of alloöcimene-maleic anhydride adduct, the alkyl group of said esters containing from 5 to 10 carbon atoms, are soluble not only in water but also in such organic solvents as hexane, carbon, tetrachloride, kerosene, benzene, etc. The bis(2-ethylhexyl) ester of alloöcimene-maleic anhydride adduct sodium sulfonate has a particularly high degree of solubility, being very soluble in both liquid paraffinic hydrocarbons and in carbon tetrachloride. Accordingly, the present products are advantageously employed as wetting-out agents in non-aqueous dry-cleaning fluids. Suitable dry-cleaning compositions comprise from, say, 1% to 5% solutions of a dialkyl ester of alloöcimene-maleic anhydride (in which the alkyl group contains from 5 to 10 carbon atoms) and a dry-cleaning solvent, for example, carbon tetrachloride, trichloroethylene, Stoddart solvent (a naphtha), benzene, etc.

I may prepare the sodium salt of the bis(2- ethylbutyl) ester of sulfonated alloöcimene-maleic anhydride adduct as follows:

Into a flask equipped with a Stark and Dean moisture determination trap topped by a condenser I charge 117 g. (0.5 mol) of alloöcimene-maleic anhydride adduct, 120 g. (1.07 mols) of 2-ethylbutanol, 300 cc. of xylene and 12 drops of concentrated sulfuric acid, and reflux the contents for 40 hours. The solvent and excess of alcohol are then removed by distillation, and the residue is further distilled in vacuo to yield 172 g. (82% theoretical yield) of the bis(2-ethylbutyl) ester of alloöcimene-maleic anhydride adduct, $b_3$ 193–7° C., $n_D^{25}$ 1.4747.

Other dialkyl esters of alloöcimene-maleic anhydride adduct were similarly prepared, employing, instead of 2-ethylbutanol, the following alcohols: ethanol, n-butanol, amyl alcohol, n-hexanol, n-heptanol, 2-ethylhexanol, n-decanol and lauryl alcohol. The reaction may be effected by employing an excess of alcohol, instead of xylene as diluent; or, instead of using xylene, any other inert solvent may be employed, for example, benzene, toluene, petroleum ether, carbon tetrachloride, etc. In order to obtain the diester, at least two moles of alcohol per mol of adduct must be employed. Mixed esters may be prepared by using mixtures of various alcohols. Instead of the pure alcohols, there may also be used technical mixtures, for example, those obtainable by hydrogenation of carbon monoxide.

Sulfonation of the diesters, for example, the bis(2-ethylbutyl) ester of alloöcimene-maleic anhydride, was effected as follows:

85 g. of the ester was dissolved in 200 cc. of dry ether and the resulting solution was added to a solution consisting of 50 cc. of chlorosulfonic acid in 200 cc. of dry ether. This reaction mixture was allowed to stand overnight, and the resulting sulfonyl chloride was hydrolyzed with 100 cc. of water. Hydrolysis is required only when chlorosulfonic acid is the sulfonating agent. The sulfonic acid thus obtained was made alkaline with an excess of sodium carbonate. The whole was then diluted to 3 liters with alcohol, brought to a boil and filtered. The residue was taken up with 1 liter of alcohol, brought to a boil and also filtered. The combined filtrates were then evaporated in vacuo on a water bath to yield 111.5 g. of the light yellow, friable, highly hygroscopic solid, the sodium salt of sulfonated bis(2-ethylbutyl) ester of alloöcimene-maleic anhydride adduct.

The sodium salts of other sulfonated dialkyl esters of alloöcimene-maleic anhydride adduct were similarly prepared, employing, instead of the bis(2-ethylbutyl) ester the following esters of alloöcimene-maleic anhydride adduct: diethyl, di-n-butyl, di-n-amyl, di-n-hexyl, di-heptyl, bis-(2-ethylhexyl), di-decyl and di-dodecyl.

For many purposes, recovery of the sodium sulfonate of the dialkyl esters of alloöcimene-maleic anhydride subsequent to neutralization with sodium carbonate is unnecessary. The crude neutralization product may be dried, for example, by drum-drying and used directly as a wetting-out agent. Also, if a pure product is desired, recovery of the same may be made by extraction with solvents other than ethanol, for example, hexane, carbon tetrachloride, etc.

The pure, dried sodium sulfonates obtained as described above by extraction with ethanol were evaluated as to wetting-out properties according to the Draves test as described on pages 162 to 165 of the Year Book of the American Association of Textile Chemists and Colorists for 1935–1936. The following results were obtained:

| Sodium sulfonate of ester of alloöcimene-maleic anhydride adduct | Wetting time, seconds—percent concentration | | | | | |
| --- | --- | --- | --- | --- | --- | --- |
|  | 0.5% | 0.25% | 0.125% | 0.062% | 0.031% | 0.016% |
| Diethyl | +180 |  |  |  |  |  |
| Dibutyl | 17.5 | 97.7 | +180 |  |  |  |
| Diamyl | 1.5 | 4.5 | 11.3 | 69.3 | +180 |  |
| Bis(2-ethylbutyl) | (¹) | 2.7 | 6.3 | 22.4 | +180 |  |
| Dihexyl | 1.6 | 2.3 | 7.3 | 22.0 | +180 |  |
| Diheptyl | 3.7 | 7.8 | 15.2 | 64.8 | +180 |  |
| Bis(2-ethylhexyl) | 3.8 | 5.7 | 9.4 | 22.2 | 64.5 | 142.7 |
| Dilauryl | 47.0 | 150.5 | +180 |  |  |  |

¹ Instantaneous.

The wetting efficiency of sulfonated esters of alloöcimene-maleic anhydride adduct thus gradually decreases with increase of carbon atoms in the alkyl group until maximum wetting efficiency is reached for esters with the 8-carbon alcohol. It then gradually decreases so that the ester of the 12-carbon alcohol is not so good a wetting-out agent as is the ester of the 4-carbon alcohol. Optimum wetting-out properties are evidenced by sodium salts of sulfonated diesters of alloöcimene-maleic anhydride adduct with alcohols of from 5 to 10 carbon atoms.

As far as I have been able to ascertain, the neutral, alkali metal, ammonium or organic base salts of sulfonated esters of alloöcimene-maleic anhydride adduct of the present invention have not been hitherto described. While I am aware that there has been disclosed the sulpho esters of cis-endomethylene-3,6-delta⁴-tetrahydrophthalic acid, obtainable by esterification of the cyclopentadiene-maleic anhydride adduct and subsequent reaction of the resulting ester with a water-soluble sulfite such as sodium bisulfite, such products do not possess the outstanding wetting-out efficiency which characterizes the neutral, sulfonated diesters of alloöcimene-maleic anhydride adduct and alcohols of from 5 to 10 carbon atoms. Thus, I have prepared and evaluated the sulpho ester of cis-endomethylene-3,6-delta⁴-tetrahydrophthalic acid and amyl alcohol, and have found that when evaluated for wetting-out properties by the Draves test described above, the wetting time in 0.5% concentration of this diamyl ester is 60 seconds and in 0.25% concentration it is above 180 seconds. On the other hand, as shown in the table above, the wetting time of the diamyl ester of the present alloöcimene-maleic anhydride adduct sodium sulfonate at 0.5% concentration is only 1.5 seconds and at 0.25% concentration it is only 4.5 seconds.

As is known, wetting-out agents find wide application in a large number of industrial processes, especially in those relating to the treatment of textiles, leather and other fibrous materials. The very good wetting-out properties of the present products in very low concentrations make them of particular usefulness as textile adjuvants in the dyebath, in the preparation of aqueous solutions, emulsions or suspensions of compounds which are in themselves sparingly soluble, for making dressings and finishings containing magnesium sulfate, for enhancing the tendency of carbonizing and mercerizing liquors to wet the fabric and as surface-active agents in dry-cleaning operations, etc.

As may be apparent to those skilled in the art, considerable latitude may be employed in the manner in which esterification of the maleic anhydride-alloöcimene adduct is effected, as well as in the sulfonation of the resulting ester. Instead of employing sulfuric acid as the esterifying catalyst, other agents known to catalyze dehydration condensations may be employed, for example, gaseous hydrogen chloride, phosphoric acid, toluenesulfonic acid, etc. Also, instead of effecting the esterification at refluxing temperatures, the reaction may be effected at lower or higher temperatures, the reaction time being varied thereby. The sulfonation of the maleic anhydride-alloöcimene adduct esters is advantageously effected with chlorosulfonic acid, but other sulfonating agents may be employed, for example, sulfuric acid, oleum, sodium or potassium bisulfite, etc. Whereas for reasons of economy, sodium carbonate is used to neutralize the sulfonic acid, other neutralizing agents may be employed, for example, potassium carbonate, sodium or potassium hydroxide, ammonium hydroxide or ammonia, isopropylamine, ethanolamine, etc.

What I claim is:

1. Sulfonates of dialkyl esters of alloöcimene-maleic anhydride adduct, the alkyl group of said esters containing from 5 to 10 carbon atoms.

2. Salts of sulfonated dialkyl esters of alloöcimene-maleic anhydride adduct, the alkyl group of said esters containing from 5 to 10 carbon atoms.

3. Alkali metal salts of sulfonated dialkyl esters of alloöcimene-maleic anhydride adduct, the alkyl group of said esters containing from 5 to 10 carbon atoms.

4. Sulfonates of the bis(2-ethylhexyl) ester of alloöcimene-maleic anhydride adduct.

5. The sodium sulfonate of the bis(2-ethylhexyl) ester of alloöcimene-maleic anhydride adduct.

6. The sodium sulfonate of the bis(2-ethylbutyl) ester of alloöcimene-maleic anhydride adduct.

7. The process which comprises sulfonating dialkyl esters of alloöcimene-maleic anhydride adduct, the alkyl group of said esters containing from 5 to 10 carbon atoms, and neutralizing the resulting sulfonic acids.

8. The process which comprises treating with a sulfonating agent the dialkyl esters of alloöcimene-maleic anhydride adduct, the alkyl group of said esters containing from 5 to 10 carbon atoms, and neutralizing the resulting sulfonic acids by treatment with a base.

9. The process which comprises sulfonating dialkyl esters of alloöcimene-maleic anhydride adduct, the alkyl group of said esters containing from 5 to 10 carbon atoms, neutralizing the resulting sulfonic acids and recovering salts of sulfonated dialkyl esters of alloöcimene-maleic anhydride adduct, the alkyl group of said esters containing from 5 to 10 carbon atoms.

10. The process defined in claim 8 further characterized in that the sulfonating agent is chlorosulfonic acid.

11. The process defined in claim 8 further characterized in that the base is an organic base.

12. The process defined in claim 8 further characterized in that the base is sodium carbonate.

13. The process which comprises sulfonating the bis(2-ethylhexyl) ester of alloöcimene-maleic anhydride adduct and neutralizing the resulting product.

14. The process which comprises sulfonating the bis(2-ethylhexyl) ester of alloöcimene-maleic anhydride adduct and then neutralizing the resulting product by treatment with a base.

15. The process which comprises reacting chlorosulfonic acid with the bis(2-ethylhexyl) ester of alloöcimene-maleic anhydride, adding water to the reaction mixture and neutralizing the resulting sulfonic acid by treatment with sodium carbonate.

16. The process which comprises sulfonating the bis(2-ethylbutyl) ester of alloöcimene-maleic anhydride adduct and neutralizing the resulting sulfonation product.

DAVID AELONY.